United States Patent
Baechtle et al.

(10) Patent No.: US 10,431,945 B1
(45) Date of Patent: Oct. 1, 2019

(54) POWER CONNECTOR HAVING A TOUCH SAFE SHROUD

(71) Applicant: TE CONNECTIVITY CORPORATION, Berwyn, PA (US)

(72) Inventors: David Robert Baechtle, Dillsburg, PA (US); Sheila Katherine Strong, Harrisburg, PA (US); Howard Wallace Andrews, Jr., Hummelstown, PA (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 0 days.

(21) Appl. No.: 15/997,023

(22) Filed: Jun. 4, 2018

(51) Int. Cl.
- *H01R 25/00* (2006.01)
- *H01R 25/16* (2006.01)
- *H02J 9/06* (2006.01)
- *H01R 24/60* (2011.01)
- *H01R 13/502* (2006.01)

(52) U.S. Cl.
CPC ......... *H01R 25/162* (2013.01); *H01R 13/502* (2013.01); *H01R 24/60* (2013.01); *H02J 9/06* (2013.01)

(58) Field of Classification Search
CPC ..... H01R 25/14; H01R 25/142; H01R 14/145
USPC ................................. 439/115, 213
See application file for complete search history.

(56) References Cited

U.S. PATENT DOCUMENTS

| | | | | |
|---|---|---|---|---|
| 2,906,811 A | * | 9/1959 | Fisher | H02G 5/06 174/88 B |
| 3,004,096 A | * | 10/1961 | Rowe | H02G 5/007 174/133 B |
| 3,559,148 A | * | 1/1971 | Hafer | H02G 5/007 174/88 B |
| 4,981,449 A | * | 1/1991 | Buchter | H01R 25/162 174/71 B |
| 5,619,014 A | * | 4/1997 | Faulkner | H02G 5/007 174/129 B |
| 5,760,339 A | * | 6/1998 | Faulkner | H01R 25/162 174/88 B |
| 7,581,972 B2 | | 9/2009 | Daamen | |
| 7,704,083 B1 | | 4/2010 | Cheyne et al. | |
| 7,806,711 B2 | | 10/2010 | Andersen et al. | |
| 7,862,359 B2 | | 1/2011 | Daily et al. | |
| 8,388,389 B2 | | 3/2013 | Costello et al. | |
| 8,449,338 B2 | | 5/2013 | Gong et al. | |
| 8,550,830 B1 | * | 10/2013 | Bhathija | H01R 31/02 439/213 |

(Continued)

FOREIGN PATENT DOCUMENTS

| CN | 204497499 U | 7/2015 |
|---|---|---|
| CN | 206293683 U | 6/2017 |

(Continued)

*Primary Examiner* — Phuong K Dinh

(57) ABSTRACT

A power connector includes a housing having a first terminal channel and an opening to the first terminal channel. The power connector includes a first power terminal received in the first terminal channel having a base configured to be coupled to a power element and contacts extending from the base for mating with a bus bar. The base is aligned with the opening to receive a fastener. The power connector includes a shroud slidable along the housing between an unactuated position and an actuated position. The shroud exposes the opening and the fastener in the unactuated position and covers the fastener in the actuated position.

20 Claims, 6 Drawing Sheets

(56) References Cited

U.S. PATENT DOCUMENTS

| | | |
|---|---|---|
| 8,764,495 B2 | 7/2014 | Ahangar et al. |
| 8,879,241 B2 | 11/2014 | Lu et al. |
| 8,911,248 B1 | 12/2014 | Wildstone et al. |
| 8,911,250 B2 | 12/2014 | Ehlen et al. |
| 9,054,456 B2 | 6/2015 | Orris et al. |
| 9,054,470 B2 | 6/2015 | YuQiang et al. |
| 9,147,948 B2 | 9/2015 | Wildstone et al. |
| 9,225,093 B2 | 12/2015 | Ahangar et al. |
| 9,419,394 B2 | 8/2016 | Wildstone et al. |
| 9,537,253 B2 | 1/2017 | Zhao |
| 9,595,962 B1 | 3/2017 | Beck et al. |
| 9,800,004 B1 | 10/2017 | Schepis et al. |
| 9,871,309 B2 | 1/2018 | Gao et al. |
| 9,882,321 B1 | 1/2018 | Hibbs et al. |
| 2017/0093075 A1 | 3/2017 | Zhao |
| 2017/0133779 A1 | 5/2017 | Zhao |
| 2017/0164505 A1 | 6/2017 | Sarti |

FOREIGN PATENT DOCUMENTS

| | | |
|---|---|---|
| EP | 2237383 A2 | 10/2010 |
| WO | 2015092742 A1 | 6/2015 |

\* cited by examiner

POWER CONNECTOR HAVING A TOUCH SAFE SHROUD

BACKGROUND OF THE INVENTION

The subject matter herein relates generally to power connectors.

Power connectors are used in systems, such as communication systems for powering components of the system. For example, power connectors are used in networks, such as servers, switches and the like for powering the server or switch components. In some known systems, the components are held in a rack and the power system includes a bus bar to supply power for the components held in the rack. The power connectors tap into the bus bar to take or supply power from the bus bar for the components. Some known systems include a tap bus bar electrically connected to the power connector. There is a need to cover conductive elements of the power connector to reduce the risk of electrocution or damage to the power connector. However, separate caps may be inadvertently removed from the power connector and/or misplaced or lost.

A need remains for a touch safe power connector.

BRIEF DESCRIPTION OF THE INVENTION

In one embodiment, a power connector is provided including a housing having a front and a rear, a first side and a second side between the front and the rear, and a first end and a second end between the front and the rear. The housing has a first terminal channel and an opening through the first side to the first terminal channel. The power connector includes a first power terminal received in the first terminal channel. The first power terminal has a base and contacts extending from the base toward the front for mating with a bus bar. The base is configured to be coupled to a power element and is aligned with the opening to receive a fastener to secure the first power terminal to the first power element. The fastener has a head at an exterior of the housing at the first side. The power connector includes a shroud coupled to the housing. The shroud is slidable along the housing between an unactuated position and an actuated position. The shroud is slid rearward from the unactuated position to the actuated position. The shroud exposes the opening and the fastener in the unactuated position. The shroud covers the fastener in the actuated position.

In another embodiment, a power system is provided for a bus bar having a bus rail including a power element configured to be electrically connected to the bus rail of the bus bar and a power connector configured to be mated to the bus rail of the bus bar. The power connector includes a housing having a front and a rear, a first side and a second side between the front and the rear, and a first end and a second end between the front and the rear. The housing has a first terminal channel and an opening through the first side to the first terminal channel. The power connector includes a first power terminal received in the first terminal channel. The first power terminal has a base and contacts extending from the base toward the front for mating with a bus bar. The base is configured to be coupled to a power element and is aligned with the opening to receive a fastener to secure the first power terminal to the first power element. The fastener has a head at an exterior of the housing at the first side. The power connector includes a shroud coupled to the housing. The shroud is slidable along the housing between an unactuated position and an actuated position. The shroud is slid rearward from the unactuated position to the actuated position. The shroud exposes the opening and the fastener in the unactuated position. The shroud covers the fastener in the actuated position.

In a further embodiment, a power connector is provided including a housing having a front and a rear, the housing having a first side and a second side between the front and the rear. The housing has a first end and a second end between the front and the rear. The housing having a first terminal channel and an opening through the first side to the first terminal channel. The opening receives a fastener securing a first power element in the first terminal channel. A first power terminal is received in the first terminal channel having a base and contacts extending from the base toward the front for mating with a bus bar. The base is electrically coupled to the first power element. A shroud is coupled to the housing and is slidable along the housing between an unactuated position and an actuated position. The shroud is slid from the unactuated position to the actuated position. The shroud covers at least one of a portion of the first power terminal and a portion of the first power element rearward of the rear of the housing in the actuated position.

DETAILED DESCRIPTION OF THE INVENTION

Figure 1:
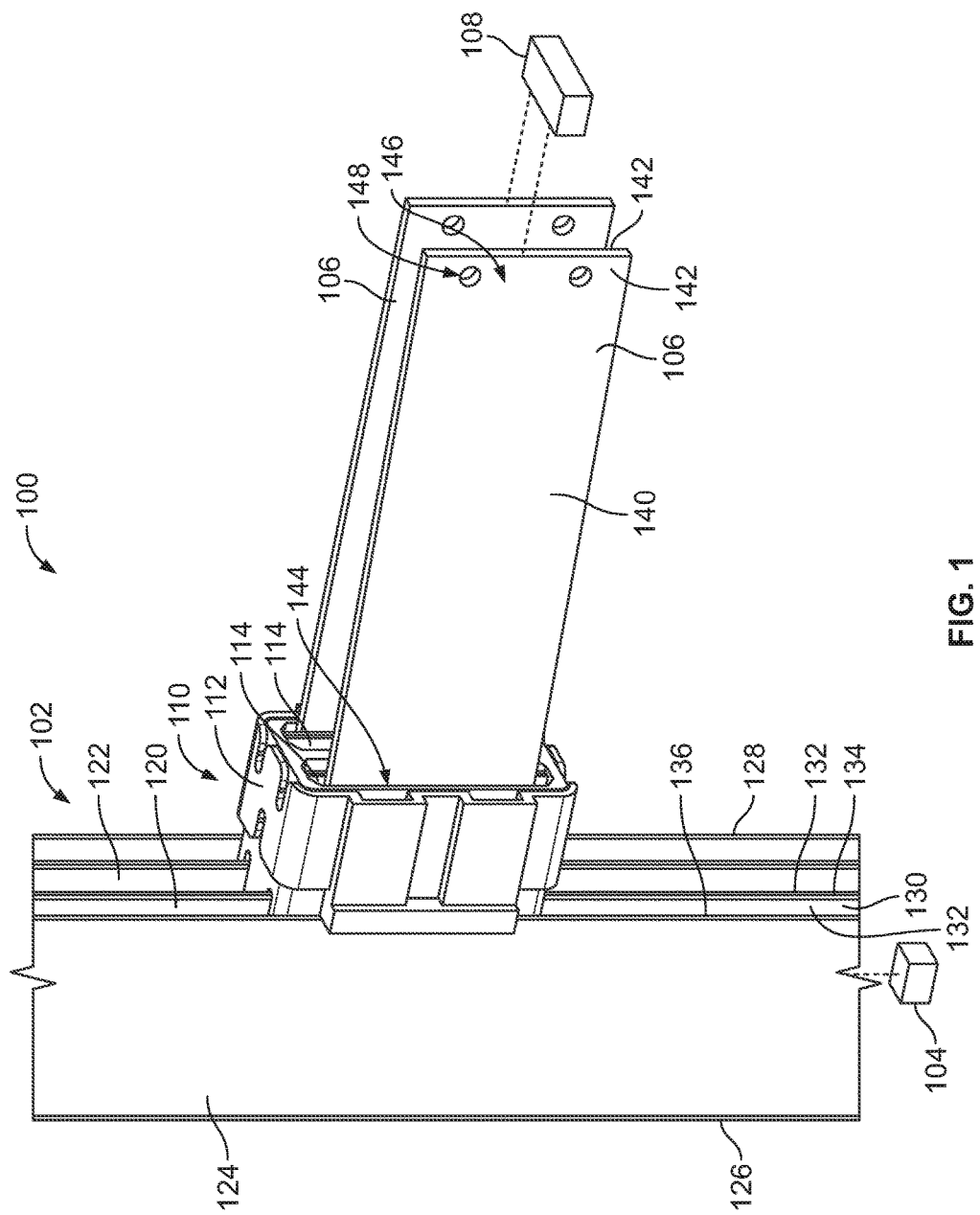
FIG. 1 illustrates a power system in accordance with an exemplary embodiment.

FIG. 1 illustrates a power system 100 in accordance with an exemplary embodiment. The power system 100 includes a distribution bus bar 102 electrically connected to a power component 104 and one or more power elements 106 electrically connected to a power supply unit 108. A power connector 110 electrically connects the power elements 106 to the bus bar 102. In various embodiments, the power connector 110 may be used as a supply power connector to supply power to the distribution bus bar 102. In other embodiments, the power connector 110 may be used as a power connector to tap into the power supply of the distribution bus bar 102.

In an exemplary embodiment, the power connector 110 includes a touch safe shroud 112 that covers metal, powered elements of the power connector 110. For example, the shroud 112 may cover one or more power terminals 114 of the power connector 110 or elements coupled to the power terminals 114, such as fasteners. The shroud 112 protects users from electrocution by covering powered components of the powered connector 110. In an exemplary embodiment, the shroud 112 is automatically deployed to a covering position when the power connector 110 is coupled to the bus bar 102. For example, the bus bar 102 may automatically move the shroud 112 to the covering position when the power connector 110 is mated with the bus bar 102.

The bus bar 102 includes a first bus rail 120 and a second bus rail 122. For example, the first bus rail 120 may be a positive rail and the second bus rail 122 may be a negative rail. The bus bar 102 includes a cover 124 which covers the bus rails 120, 122. The bus bar 102 extends between a front 126 and a rear 128. The power connector 110 is coupled to the rear 128 of the bus bar 102. Optionally, the bus bar 102 may be oriented vertically with the bus rails 120, 122 extending vertically. Other orientations are possible in alternative embodiments. In an exemplary embodiment, each bus rail 120, 122 includes a metal plate 130 having sides 132 extending to a mating edge 134. The power connector 110 is coupled to the mating surfaces at the sides 132 of the bus rails 120, 122. In an exemplary embodiment, the cover 124 includes a wall 136 at the rear 128. The power connector 110 is configured to engage the wall 136. For example, the shroud 112 may engage the wall 136 of the cover 124.

In the illustrated embodiment, the power elements 106 include metal plates 140 having sides 142. The power element 106 has a mating element 144 at an end of the plate 140. The mating element 144 is configured to be mated with the power connector 110. In the illustrated embodiment, the mating element 144 is defined by an end of the plate 140. The mating element 144 includes openings for receiving a fastener to mechanically and electrically secure the power element 106 and the power connector 110. In an exemplary embodiment, the power element 106 has a second mating element 146 at the end opposite the mating element 144. The second mating element 146 includes openings 148 configured to receive a fastener to mechanically and electrically connect the power element 106 to another component, such as to the power supply unit 108. In the illustrated embodiment, the plate 140 is planar and rectangular. However, the power element 106 may have other shapes in alternative embodiments, such as being formed or bent into an alternative shape. In various alternative embodiments, the power elements 106 may be power wires configured to be terminated to the power connector 110 rather than a metal plate.

Figure 2:
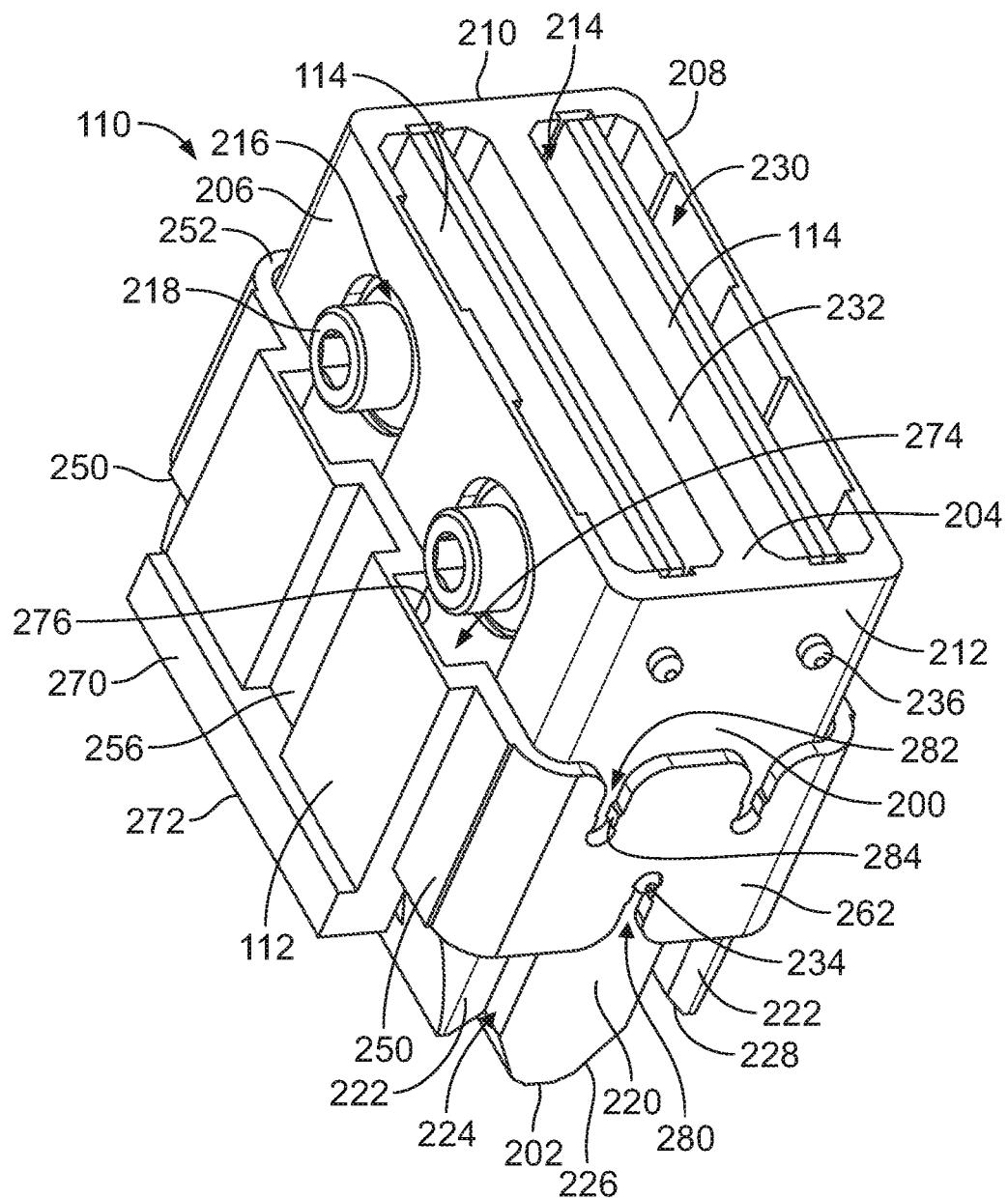
FIG. 2 is a rear perspective view of a power connector of the power system in accordance with an exemplary embodiment showing a shroud in an unactuated position.
Figure 3:
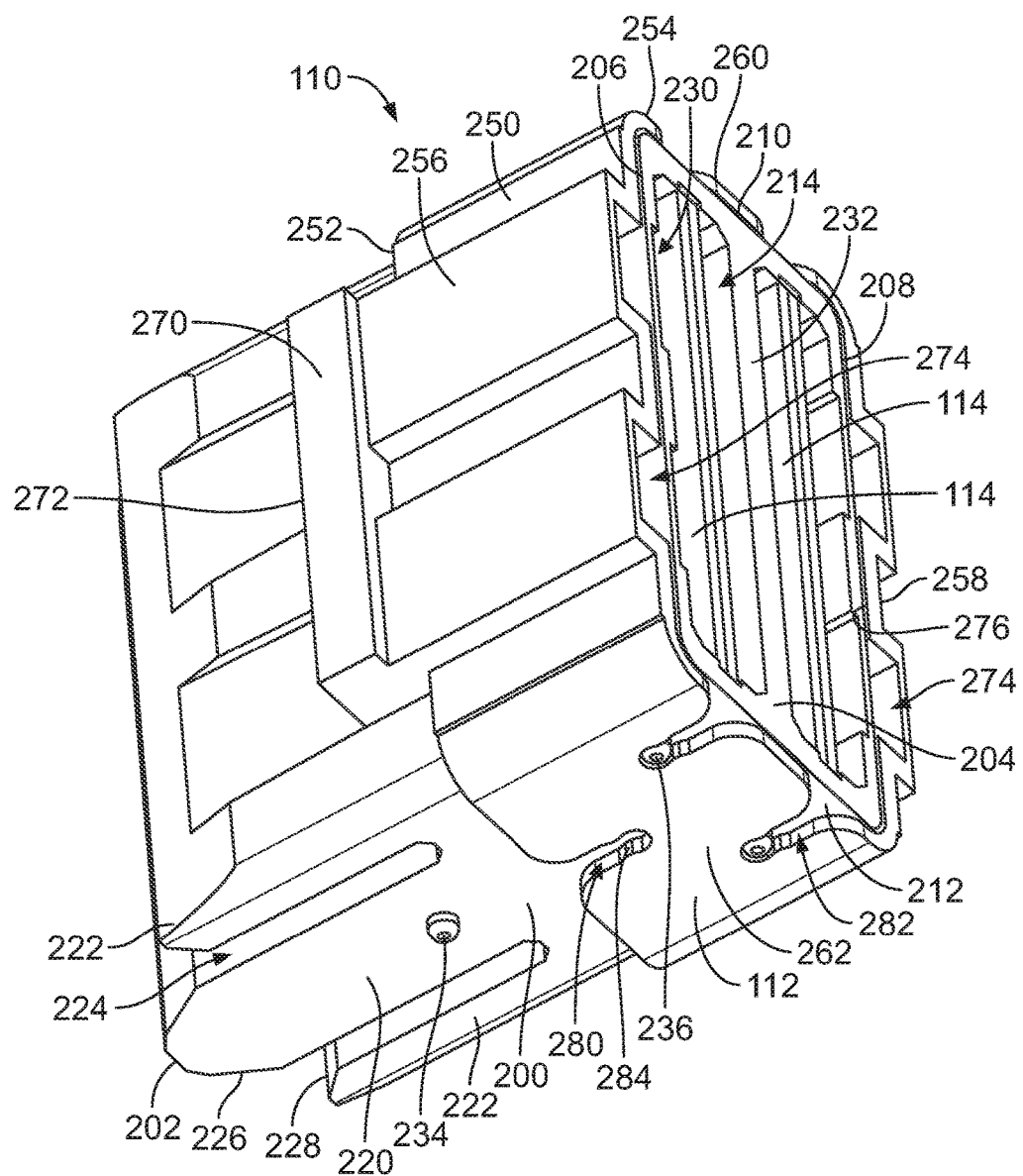
FIG. 3 is a rear perspective view of the power connector in accordance with an exemplary embodiment showing the shroud in an actuated position.

FIG. 2 is a rear perspective view of the power connector 110 in accordance with an exemplary embodiment showing the shroud 112 in an unactuated position. FIG. 3 is a rear perspective view of the power connector 110 in accordance with an exemplary embodiment showing the shroud 112 in an actuated position. In an exemplary embodiment, the shroud 112 is slidable between the unactuated position and the actuated position. The shroud 112 covers portions of the power connector 110 in the actuated position to make the power connector 110 touch-safe.

The power connector 110 includes a housing 200 having a front 202, a rear 204, a first side 206, a second side 208, a first end 210, and a second end 212. In the illustrated embodiment, the housing 200 is generally box-shaped; however, the housing 200 may have other shapes in alternative embodiments. The sides 206, 208 extend between the front 202 and the rear 204. The ends 210, 212 extend between the front 202 and the rear 204. Optionally, the first end 210 may define a top end and the second end 212 may define a bottom end; however, the power connector 110 may have other orientations in alternative embodiments, such as where the first side 206 is a top side and the second side 208 is a bottom side.

The housing 200 includes one or more terminal channels 214 that receive the power terminals 114. For example, in the illustrated embodiment, the housing 200 includes first and second terminal channels 214 that receive corresponding first and second power terminals 114. The terminal channels 214 are open at the front 202 and the rear 204 to expose the power terminals 114 for mating with the bus bar 102 and the power elements 106. In an exemplary embodiment, the power terminals 114 are loaded into the terminal channels 214, such as through the rear 204. Optionally, portions of the power terminals 114 may extend from the rear 204 and/or the rear 204 may be notched or have windows exposing portions of the power terminals 114, such as for mating the power terminals 114 to the power elements 106. The shroud 112 may cover the exposed portions of the power terminals 114 and portions of the power elements 106. The power terminals 114 may be held in the terminal channels 214 by an interference fit in various embodiments. The housing 200 may include more than two terminal channels 214 in other various embodiments.

In an exemplary embodiment, the housing 200 includes openings 216 in the first and second sides 206, 208 that are open to the terminal channels 214. The openings 216 receive fasteners 218 in the terminal channels 214. In an exemplary embodiment, the fasteners 218 may be used to secure the power elements 106 in the housing 200. The fasteners 218 may be used to secure the power terminals 114 in the housing 200.

The housing 200 includes a base 220 and wings 222 extending from the base 220 to form bus bar slots 224 at the front 202. The bus bar slots 224 are configured to receive corresponding bus rails 120, 122 (shown in FIG. 1). In an exemplary embodiment, the base 220 protrudes forward of the wings 222 at the center of the housing 200. The base 220 is used to guide mating with the bus bar 102. In an exemplary embodiment, the base 220 includes chamfered lead-ins 226 at the front 202 that open up to the bus bar slots 224. Optionally, the wings 222 include chamfered lead-ins 228 that open to the bus bar slots 224. The power terminals 114 are exposed in the bus bar slots 224 for mating with the bus rails 120, 122. For example, the power terminals 114 may extend along the base 220 and/or the wings 222 to engage the bus rails 120, 122.

In an exemplary embodiment, the housing 200 includes power elements slots 230 at the rear 204 that receives the power elements 106. The power elements slots 230 may be open to the terminal channels 214. In the illustrated embodiment, the power elements slots 230 are located between the terminal channels 214 and the corresponding first and second sides 206, 208. The openings 216 open to the power elements slots 230 such that the fasteners 218 may engage the power elements 106 in the power elements slots 230.

In an exemplary embodiment, the base 220 includes a separating wall 232 between the terminal channels 214. The separating wall 232 separates the power terminals 114 from each other. The separating wall 232 provides electrical isolation of the power terminals 114 from each other. In the illustrated embodiment, the separating wall 232 extends vertically between the first end 210 and the second end 212.

In an exemplary embodiment, the housing 200 includes one or more latching features for securing the shroud 112 relative to the housing 200. In the illustrated embodiment, the housing 200 includes a forward latching feature 234 and one or more rear latching features 236. The rear latching features 236 are rearward of the forward latching feature 234. In the illustrated embodiment, the latching features 234, 236 are provided at the first end 210 and the second end 212. The latching features 234, 236 interface with the shroud 112 to position the shroud 112 relative to the housing 200. In an exemplary embodiment, the shroud 112 engages the forward latching features 234 to hold the shroud 112 in the unactuated position and the shroud 112 engages the rear latching features 236 to hold the shroud 112 in the actuated position. In the illustrated embodiment, the latching features 234, 236 are defined by protrusions extending from the housing 200. Optionally, the protrusions may be cylindrical posts; however, the protrusions may have other shapes in alternative embodiments. Other types of latching features may be used in alternative embodiments, such as clips. In other alternative embodiments, rather than being latching features 234, 236, the protrusions may be used as blocking features used to hold the shroud 112 on the housing 200 to prevent the shroud 112 from falling off of the housing 200.

The shroud 112 includes a body 250 extending between a front 252, a rear 254, a first side 256, a second side 258, a first end 260 and a second end 262. The shroud 112 may be manufactured from a dielectric material, such as a plastic material. The shroud 112 is located along the exterior perimeter of the housing 200. In the illustrated embodiment, the shroud 112 is a single, unitary piece. Alternatively, the body 254 may be defined by multiple body sections, such as a left half and a right half, which may be coupled to the first and second sides 206, 208, respectively. In an exemplary embodiment, the shroud 112 peripherally surrounds the housing 200. The shroud 112 is slidable along the exterior of the housing 200 between the unactuated position and the actuated position. In the unactuated position, the shroud 112 is located toward the forward end of the housing 200. In the actuated position, the shroud 112 is positioned toward the rear end of the housing 200. In the actuated position, the shroud 112 covers the fasteners 218. In the unactuated position, the shroud 112 is positioned forward of the openings 216 and the fasteners 218 to provide access to the openings 216 and the fasteners 218 for assembly of the power connector 110. For example, the openings 216 are exposed for loading the fasteners 218 into the openings 216 to secure the power terminals 114 and the power elements 106 in the housing 200.

The shroud 112 includes a mating arm 270 at the front 252. The mating arm 270 extends along the first side 256 and the shroud 112 may include another mating arm along the second side 258. The mating arm 270 is configured to engage the leading edge 136 of the protective cover 126 of the bus bar 102 (shown in FIG. 2) when the power connector 110 is coupled to the bus bar 102. In the illustrated embodiment, the mating arm 270 includes a flat front surface 272 configured to engage the protective cover 126 of the bus bar 102 during mating therewith. During mating, the shroud 112 may be pushed from the unactuated position to the actuated position by the protective cover 126 of the bus bar 102 engaging the mating arm 270.

In an exemplary embodiment, the shroud 112 includes pockets 274 along an interior 276 of the shroud 112. The interior 276 faces the housing 200. The pockets 274 are configured to receive the fasteners 218. The pockets 274 may be open at the rear 254 of the shroud 112 to receive the fasteners 218.

In an exemplary embodiment, the shroud 112 includes latching features that engage the latching features of the housing 200 to secure the position of the shroud 112 relative to the housing 200. In the illustrated embodiment, the shroud 112 includes a forward latching feature 280 and rear latching features 282. The forward latching features 280 are provided at the front 254 and the rear latching features 282 are provided at the rear 254. In the illustrated embodiment, the latching features 280, 282 are slots formed in the body 250. Other types of latching features may be provided in alternative embodiments. In the illustrated embodiment, the latching features 280, 282 include latching tabs 284 extending into the slots that are configured to engage the protrusions defining the latching features 234, 236. The forward latching feature 280 engages the forward latching feature 234 in the unactuated position. The rear latching features 280 to engage the rear latching features 236 in the actuated position. The latching tabs 284 provide interference to hold the shroud 112 in the unactuated position or the actuated position, respectively.

Figure 4:
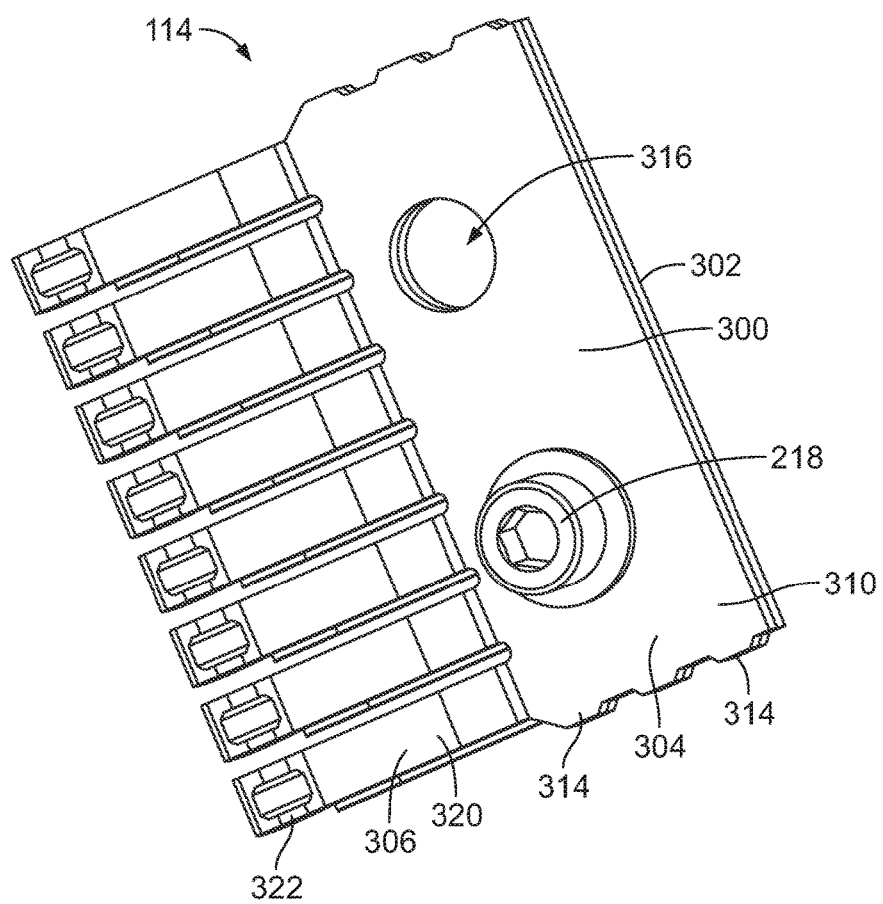
FIG. 4 is a perspective view of a power terminal of the power connector in accordance with an exemplary embodiment.
Figure 5:
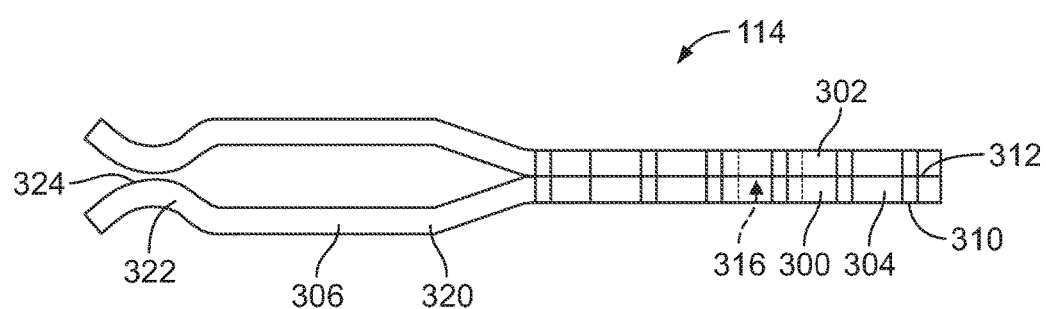
FIG. 5 is a top view of the power terminal in accordance with an exemplary embodiment.

FIG. 4 is a perspective view of the power terminal 114 in accordance with an exemplary embodiment. FIG. 5 is a top view of the power terminal 114 in accordance with an exemplary embodiment. In the illustrated embodiment, the power terminal 114 includes a first terminal 300 and a second terminal 302 arranged back-to-back to form the power terminal 114. The first and second terminals 300, 302 may be mirrored versions of each other. However, the first and second terminals 300, 302 may not be mirrored, such as if there is an offset of the bus bars or if there is a bus bar thickness variation that is accommodated with left and right versions with differing offsets. The first and second terminals 300, 302 are configured to be secured together using the fasteners 218. In other various embodiments, the first and second terminals 300, 302 may be soldered or welded together. In other various embodiments, the power terminal 114 may be a single structure, such as the first terminal 300 rather than being a multi-piece structure.

The power terminal 114 includes a base 304 and contacts 306 extending forward of the base 304. The contacts 306 may be stamped and formed with the base 304 from a sheet of metal. The base 304 includes a first side 310 and a second side 312. When the first and second terminals 300, 302 are coupled together, the second sides 312 face each other. The base 304 may be planar. In an exemplary embodiment, the base 304 includes tabs 314 at opposite ends of the base 304 that are used to position the power terminal 114 in the housing 200. The tabs 314 may dig into the plastic material of the housing 200 to hold the power terminal 114 in the housing 200 by an interference fit. The base 304 includes openings 316 that receive the fasteners 218.

Each contact 306 includes an arm 320 extending from the base 304 and a finger 322 at the distal end of the contact 306. The finger 322 has a mating interface 324 configured to be mated with the bus bar 102, such as one of the bus rails 120, 122 (shown in FIG. 1). In the illustrated embodiment, the fingers 322 are curved to define a curved mating interface 324. The arms 320 are separate from each other and independently movable relative to each other. For example, the arms 322 may be cantilevered from the base 304 with gaps therebetween. The contacts 306 form spring beams configured to be deflected when mated with the bus rails 120, 122 such that the contacts 306 are spring biased against the bus rails 120, 122. In the illustrated embodiment, the arms 320 are bent out of plane relative to the base 304 to position the mating interfaces 324 for mating with the bus rails 120, 122.

Figure 6:
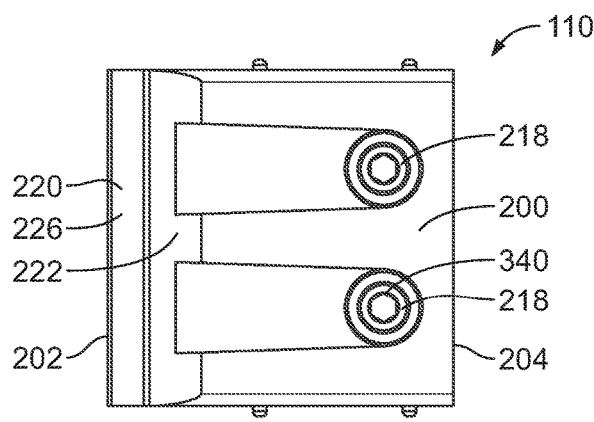
FIG. 6 is a side view of the power connector in accordance with an exemplary embodiment.
Figure 7:
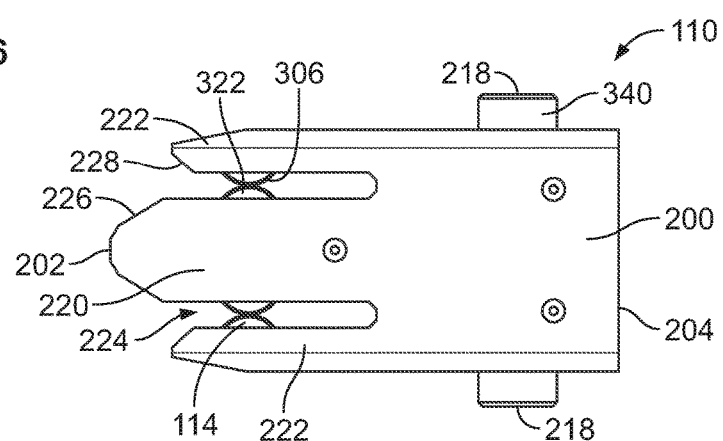
FIG. 7 is a top view of the power connector in accordance with an exemplary embodiment.
Figure 8:
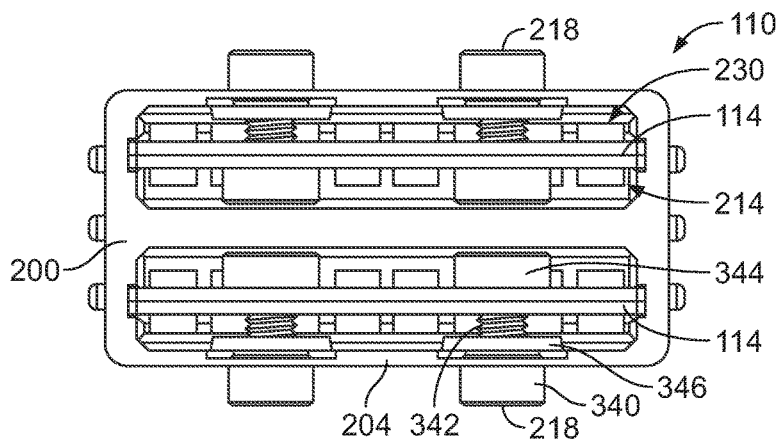
FIG. 8 is a rear view of the power connector in accordance with an exemplary embodiment.

FIG. 6 is a side view of the power connector 110 in accordance with an exemplary embodiment. FIG. 7 is a top view of the power connector 110 in accordance with an exemplary embodiment. FIG. 8 is a rear view of the power connector 110 in accordance with an exemplary embodiment.

As shown in FIG. 8, the power terminals 114 are loaded into the housing 200 and through the rear 204. In an exemplary embodiment, each fastener 218 includes a head 340 and a shank 342 extending from the head 340; however, the fastener 218 may be provided without a head 340 in other various embodiments, such as being a threaded rod. In an exemplary embodiment, the shank 342 may be threaded and configured to be threadably coupled to a nut 344. Optionally, a washer 346, such as a coned-disc spring washer may be coupled to the shank 342 to load the fastener 218 against the housing 200 and/or the power terminal 114. For example, the power elements 106 (shown in FIG. 1) may be received in corresponding power elements slots 230 at the rear 204 of the housing 200. The fasteners 218 may pass through the power elements 106 and the power terminals 114 to mechanically and electrically connect the power elements 106 to the power terminals 114.

The power terminals 114 extend through the housing 200 toward the front 202 for mating with the bus bar 102. For example, the contacts 306 may be arranged in the bus bar slots 224 to engage the bus rails 120, 122 (shown in FIG. 1) when the bus rails 120, 122 are loaded into the bus bar slots 224. The fingers 322 are positioned on opposite sides of the corresponding bus bar slot 224 to engage both sides of the corresponding bus rails 120, 122. The arms 320 are deflectable within the housing 200 during mating with the bus rails 120, 122. The lead-ins 226, 228 on the base 220 and the wings 222 are used to guide the bus rails 120, 122 into the bus bar slots 224.

Figure 9:
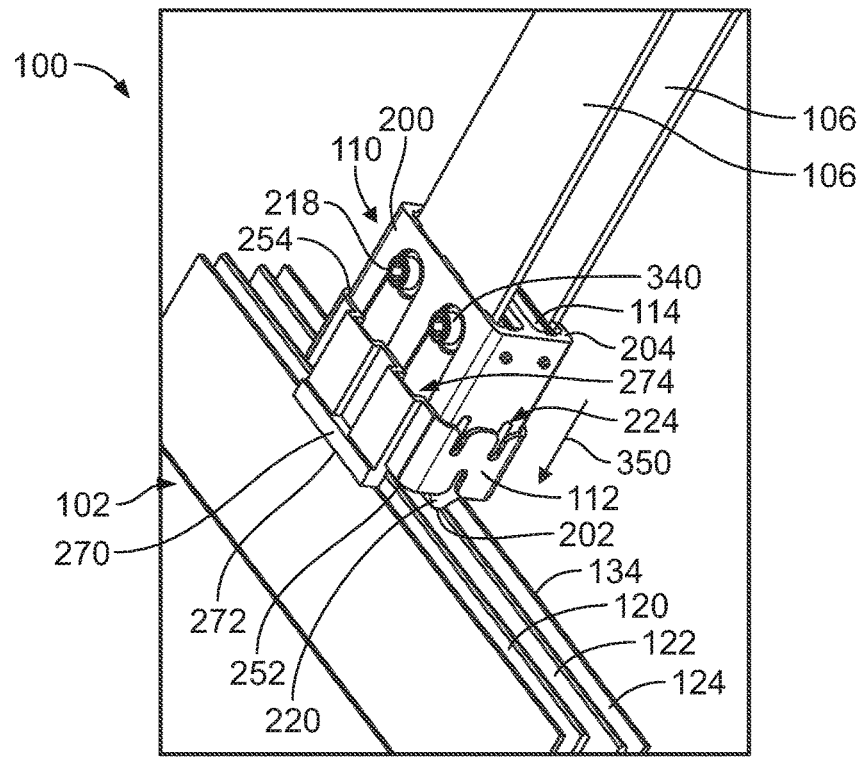
FIG. 9 illustrates the power system in accordance with an exemplary embodiment showing the power connector poised for mating with a bus bar of the power system.
Figure 10:
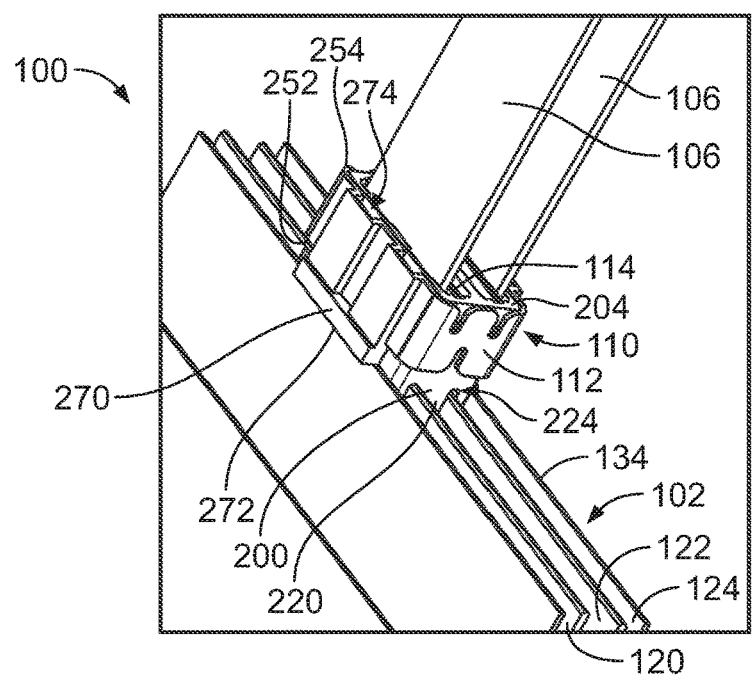
FIG. 10 illustrates the power system in accordance with an exemplary embodiment showing the power connector mated with the bus bar.

FIG. 9 illustrates the power system 100 in accordance with an exemplary embodiment showing the power connector 110 poised for mating with the bus bar 102. FIG. 10 illustrates the power system 100 in accordance with an exemplary embodiment showing the power connector 110 mated with the bus bar 102. Prior to mating, the shroud 112 is located in the unactuated position. The shroud 112 is located in the front 202 of the housing 200. The mating arm 270 is positioned at the front 252 of the shroud 112 to engage the bus bar 102, such as the cover 124 of the bus bar 102. The mating arm 270 is positioned to engage the bus bar 102 to automatically actuate the shroud 112 during mating. Additionally or alternatively, the shroud 112 may be manually actuated. In various embodiments, the shroud 112 may be returned to the unactuated position when the power connector 110 is unmated from the bus bar 102. For example, the shroud 112 may be manually returned to the unactuated position or may be automatically returned, such as by a return spring or by a clip or catch surface engaging or catching on the cover 124.

During mating, the base 220 of the housing 200 is aligned between the first and second bus rails 120, 122. The bus rails 120, 122 are aligned with the bus bar slots 224. The power connector 110 may be blind mated with the bus bar 102 using the guide features defined by the lead-in 226 at the front 202 of the housing 200. The housing 200 is pushed in a mating direction 350 into the bus bar 102. As the housing 200 is moved in the mating direction 350, the bus rails 120, 122 are received in corresponding bus bar slots 224. The power terminals 114 are electrically connected to the bus rails 120, 122 as the power connector 110 is mated with the bus bar 102.

As the housing 200 is moved in the mating direction 350, the mating arm 270 engages the bus bar 102 to actuate the shroud 112. For example, the front surface 272 of the mating arm 270 engages the mating edge 134 of the cover 124. As the housing 200 is moved in the mating direction 350, the shroud 112 is unable to move with the housing 200. As such, the housing 200 moves relative to the shroud 112. The shroud 112 is moved from the unactuated position to the actuated position. As such, the shroud 112 is automatically actuated by the mating process of the power connector 110 with the bus bar 102. The operator does not have to separately or independently move the shroud 112 relative to the housing 200 from the unactuated position to the actuated position. As such, there is no risk of the operator accidentally forgetting to move the shroud 112 to the actuated or covering position.

In an exemplary embodiment, in the actuated position, the rear 254 of the shroud 112 is at or rearward of the rear 204 of the housing 200. The shroud 112 covers the fasteners 218. For example, the heads 340 of the fasteners 218 are received in corresponding pockets 274. The shroud 112 covers the fasteners 218 to avoid inadvertent touching of the powered fasteners 218. Optionally, the shroud 112 may extend rearward of the housing 200 to cover at least a portion of the power elements 106.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A power connector comprising:
   a housing having a front and a rear, the housing having a first side and a second side between the front and the rear, the housing having a first end and a second end between the front and the rear, the housing having a first terminal channel and an opening through the first side to the first terminal channel, the opening receives a fastener used to secure a power element in the first terminal channel, the fastener being exposed at an exterior of the housing;

a first power terminal received in the first terminal channel, the first power terminal having a base and contacts extending from the base toward the front for mating with a bus bar, the base configured to be coupled to the power element; and a shroud coupled to the housing, the shroud being slidable along the housing between an unactuated position and an actuated position, the shroud being slid from the unactuated position to the actuated position, the shroud exposing the opening and the fastener in the unactuated position, the shroud covering the fastener in the actuated position.

2. The power connector of claim 1, wherein the shroud is moved from the unactuated position to the actuated position by the bus bar when the power connector is mated with the bus bar.

3. The power connector of claim 1, wherein the shroud includes a mating arm at a front of the shroud, the mating arm configured to engage the bus bar when the power connector is mated with the bus bar, the mating arm pressing the shroud from the unactuated position to the actuated position.

4. The power connector of claim 1, wherein the housing includes a latching feature, the shroud including a latching feature engaging the latching feature of the housing to hold a position of the shroud relative to the housing.

5. The power connector of claim 1, wherein the housing includes a front latching feature and a rear latching feature rearward of the front latching feature, the shroud including a front latching feature and a rear latching feature rearward of the front latching feature, the front latching feature of the shroud engaging the front latching feature of the housing in the unactuated position to hold the shroud in the unactuated position, the rear latching feature of the shroud engaging the rear latching feature of the housing in the actuated position to hold the shroud in the actuated position.

6. The power connector of claim 1, wherein the shroud includes a pocket aligned with the fastener, the pocket receiving the fastener in the actuated position.

7. The power connector of claim 1, wherein the housing includes a bus bar slot at the front configured to receive the bus bar, the shroud at least partially covering the bus bar slot in the unactuated position.

8. The power connector of claim 1, wherein the housing includes a base and a wing extending forward from the base to form a bus bar slot, the bus bar slot configured to receive the bus bar between the base and the wing, the power contact extending into the bus bar slot to engage the bus bar.

9. The power connector of claim 1, wherein the fastener is configured to engage and secure the power element in the housing.

10. The power connector of claim 1, wherein the housing includes a second terminal channel and a second opening through the second side to the second terminal channel, the power connector further comprising a second power terminal received in the second terminal channel.

11. The power connector of claim 1, wherein the housing includes a power element slot open to the first terminal channel at the rear to receive the power element.

12. The power connector of claim 1, wherein the first power terminal is loaded into the first terminal channel through the rear.

13. The power connector of claim 1, wherein the fastener includes a head protruding beyond the first side, the shroud covering the head in the actuated position.

14. The power connector of claim 1, wherein the shroud peripherally surrounds the housing.

15. The power connector of claim 1, further comprising a second power terminal received in the first terminal channel, the second power terminal having a base and contacts extending from the base toward the front for mating with the bus bar, the base of the second power terminal coupled to the base of the first power terminal.

16. The power connector of claim 1, wherein the shroud includes a rear edge, the rear edge being at or rearward of the rear of the housing in the actuated position.

17. A power system for a bus bar having a bus rail, the power system comprising:
a power element configured to be electrically connected to the bus rail of the bus bar, the power element having a mating element; and
a power connector configured to be mated to the bus rail of the bus bar, the power connector comprising:
a housing having a front and a rear, the housing having a first side and a second side between the front and the rear, the housing having a first end and a second end between the front and the rear, the housing having a first terminal channel and an opening through the first side to the first terminal channel to receive a fastener used to secure the power element in the housing;
a first power terminal received in the first terminal channel, the first power terminal having a base and contacts extending from the base toward the front for mating with the bus bar, the base being coupled to the power element; and
a shroud coupled to the housing, the shroud being slidable along the housing between an unactuated position and an actuated position, the shroud exposing the opening and the fastener in the unactuated position, the shroud covering the fastener in the actuated position.

18. The power system of claim 17, wherein the shroud includes a mating arm at a front of the shroud, the mating arm configured to engage the shroud bus bar when the power connector is mated with the shroud bus bar, the mating arm pressing the shroud from the unactuated position to the actuated position.

19. The power system of claim 17, wherein the head of the fastener protrudes beyond the first side, the shroud covering the head in the actuated position.

20. A power connector comprising:
a housing having a front and a rear, the housing having a first side and a second side between the front and the rear, the housing having a first end and a second end between the front and the rear, the housing having a first terminal channel and an opening through the first side to the first terminal channel, the opening receives a fastener securing a first power element in the first terminal channel;
a first power terminal received in the first terminal channel, the first power terminal having a base and contacts extending from the base toward the front for mating with a bus bar, the base being electrically coupled to the first power element; and
a shroud coupled to the housing, the shroud being slidable along the housing between an unactuated position and an actuated position, the shroud being slid from the unactuated position to the actuated position, the shroud covering at least one of a portion of the first power terminal and a portion of the first power element rearward of the rear of the housing in the actuated position.

* * * * *